3,423,839
APPARATUS FOR CHECKING WHEEL
ALIGNMENT CHARACTERISTICS
George W. Liskey, Okemos, Mich., assignor to FMC
Corporation, a corporation of Delaware
Filed Oct. 19, 1964, Ser. No. 404,657
U.S. Cl. 33—203.18    12 Claims
Int. Cl. G01b 5/24, 7/30

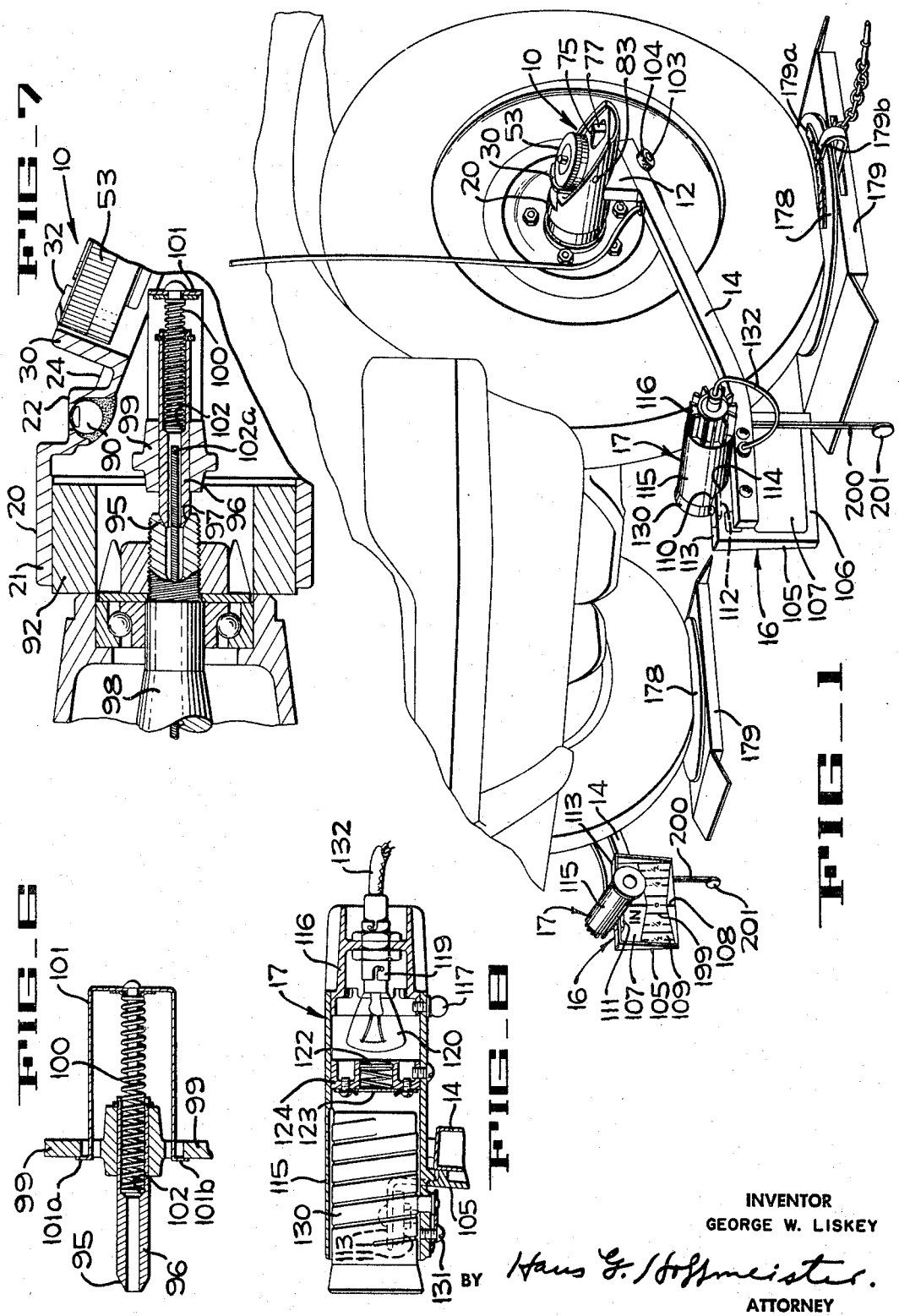

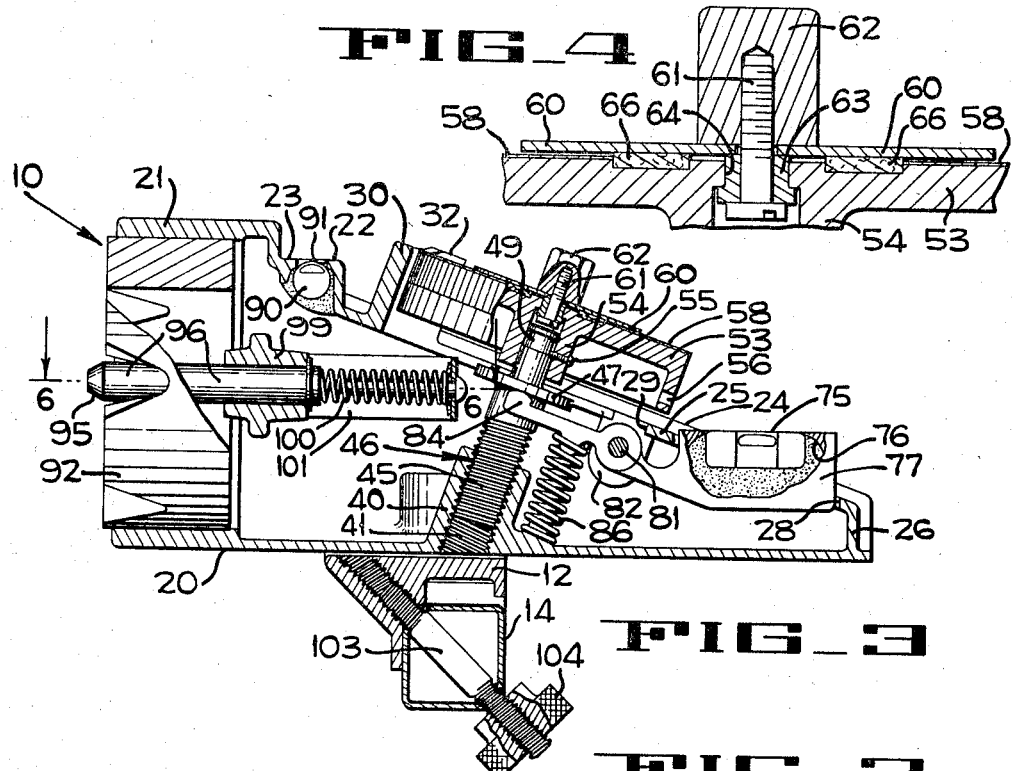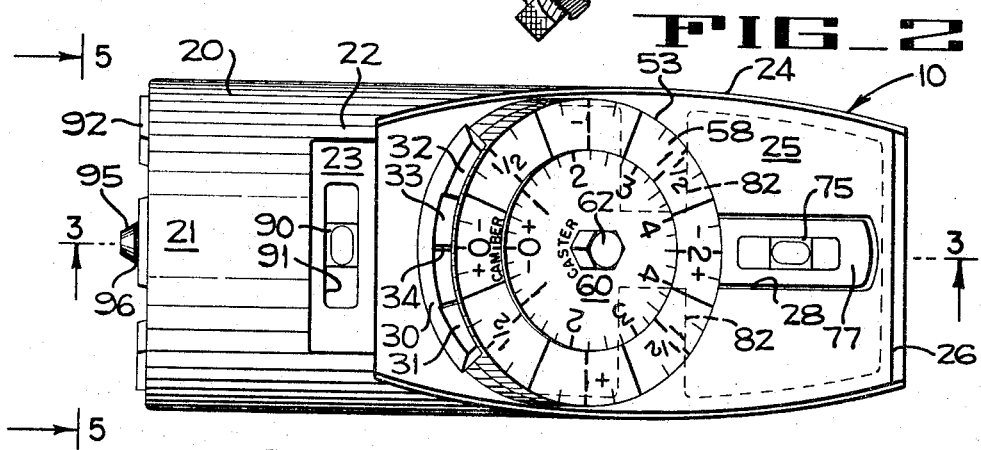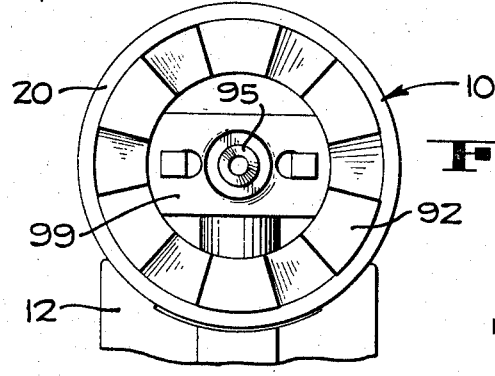

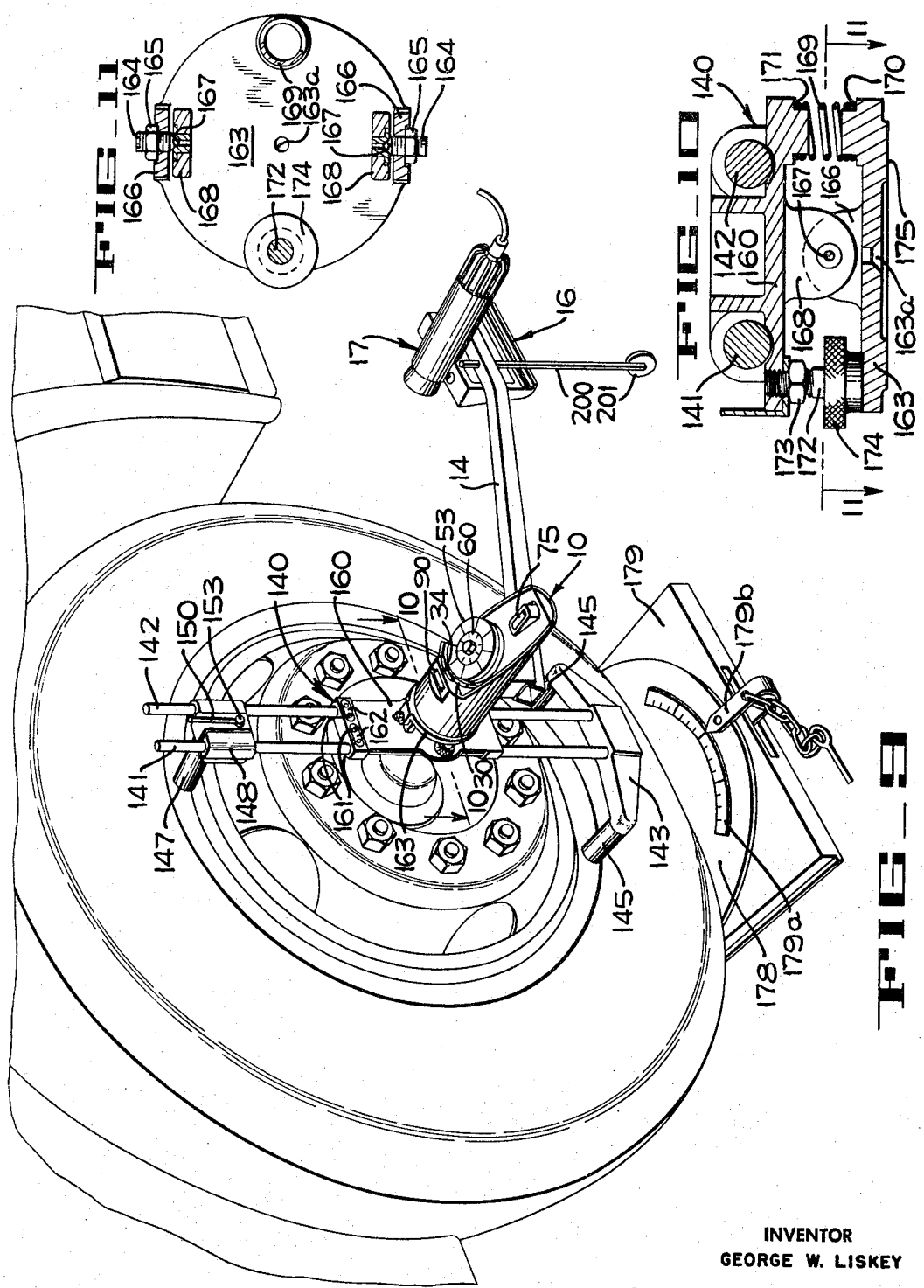

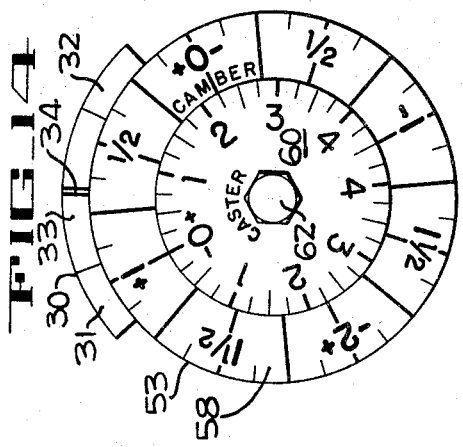
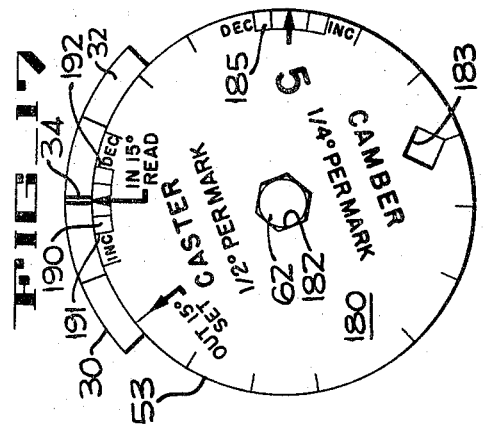
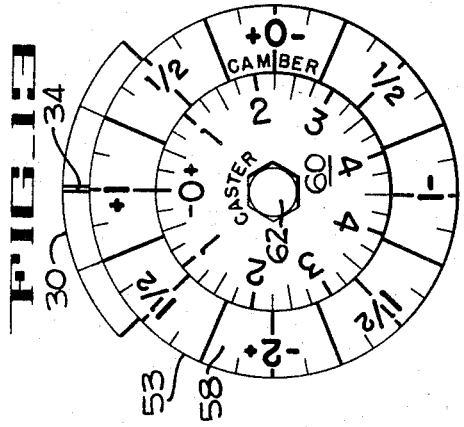
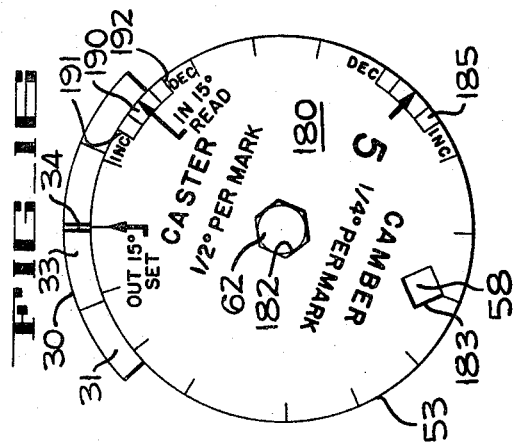
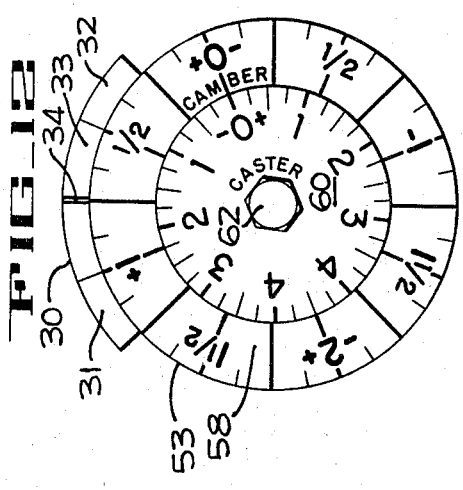
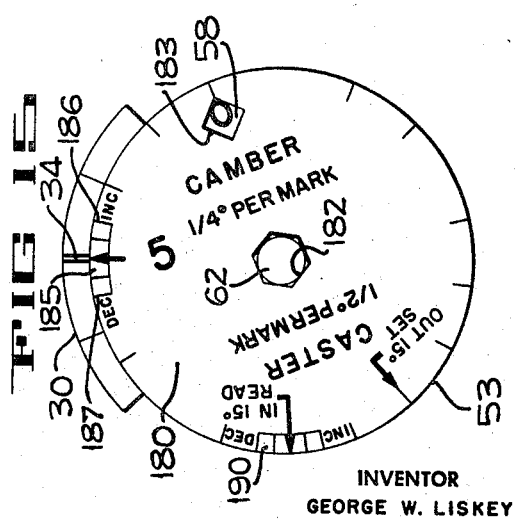
INVENTOR
GEORGE W. LISKEY United States Patent Office 3,423,839
Patented Jan. 28, 1969

ABSTRACT OF THE DISCLOSURE

The alignment gauge provides a magnetically coupled extension of the wheel spindle hub and has concentric, independently rotatable and coaxially arranged top-reading caster and camber dials for universal application, and replaceable, specially calibrated dial templates which can be mounted over and individually replace the universal dials so that only one dial is required to measure the critical caster and camber alignment factors for a particular make or type of vehicle. The latter operation (for camber) cooperatively includes the use of the universal camber dial by means of a window in the template to align the template with the universal camber dial.

---

This invention pertains to apparatus for checking the alignment of vehicle wheels, and more particularly concerns an improved gauge adapted for determining the camber and caster characteristics of automobiles.

In recent years many models of automobiles have been marketed, including standard size cars, compacts, foreign cars, and sports cars. As a result, several wheel mounting and front axle arrangements have been developed. Accordingly it has been necessary heretofore for a garage to obtain several types of wheel alignment testing apparatus in order to be able to service all types of automobiles.

An object of the present invention is to provide a wheel alignment checking system that is adapted for use with any passenger car or truck to carry out a complete wheel alignment job.

Another object is to provide an improved, efficient gauge for a wheel alignment testing system.

Another object is to provide a wheel alignment checking system that is portable and can be used anywhere— inside or outside of a garage.

Another object is to provide a device for compensating for run-out due to imperfect wheel rims.

Another object is to provide an efficient template system for use with wheel alignment checking apparatus.

Another object is to provide an improved clamp mechanism for mounting gauges and the like on wheels for test purposes.

Other and further features, objects, and advantages of the present invention will be apparent from the following description, taken in connection with the accompanying drawings in which:

FIGURE 1 is a perspective of the wheel checking apparatus of the present invention, the apparatus associated with only one wheel of an automobile being fully shown.

FIGURE 2 is a plan of the portable gauge used in the apparatus of FIG. 1.

FIGURE 3 is a vertical section taken along line 3—3 of FIG. 2.

FIGURE 4 is an enlargement of a portion of FIG. 3.

FIGURE 5 is an end view of the gauge, the view being taken looking in the direction of line 5—5 of FIG. 2.

FIGURE 6 is a section taken along line 6—6 of FIG. 3.

FIGURE 7 is a vertical section showing a part of the gauge in operative association with an automobile wheel.

FIGURE 8 is an enlarged longitudinal section taken through one of the projectors.

FIGURE 9 is a perspective showing a second embodiment of the wheel checking apparatus of the present invention.

FIGURE 10 is an enlarged section taken along line 10—10 of FIG. 9.

FIGURE 11 is a section taken along line 11—11 of FIG. 10.

FIGURES 12, 13 and 14 are schematic plan views showing typical settings of the gauge when camber and caster measurements are made.

FIGURES 15, 16 and 17 are schematic plan views showing typical settings when templates are used to make camber and caster measurements.

In the embodiment of the invention chosen for illustration in FIGURE 1, the reference numeral 10 indicates a gauge that is adapted to magnetically grip the end of a wheel hub to lock the gauge in operative position for making camber and caster determinations. The gauge 10 is provided with a mounting bracket 12 to which one end of a support rod 14 is removably secured. A toe-in, toe-out chart 16 and a projector 17 are mounted on the other end of the support rod in a manner that will be described more fully presently. It will be evident that, in order to measure the toe-in, toe-out characteristics of the vehicle wheels, a checking unit including a gauge 10, a support rod 14, a chart, and a projector must be mounted on each of the front wheels of a vehicle so that the projector 17 of one unit will direct its beam onto the chart 16 of the opposite unit.

Each gauge 10 comprises a generally cylindrical cast aluminum housing 20 (FIGS. 2 and 3) that has a truly cylindrical section 21, a substantially cylindrical section 22 having a flattened wall 23, and a fragmentary cylindrical section 24 that has a sloping wall 25. A short end wall 26 closes one end of the housing. An elongated slot 28 (FIG. 2) and a generally circular opening 29 (FIG. 3) are provided in the sloping wall 25. An upstanding arcuate wall 30 projects upwardly from the sloping wall 25 adjacent one edge of the opening 29. The upper surface of the arcuate wall 30 (FIG. 2) has three reference surfaces at different levels. The surface 31 is the lowest surface; the surface 32 is the highest; and surface 33, which has a reference groove or index mark 34 formed thereon, is at a height exactly intermediate the heights of the surfaces 31 and 32, that is, the distance between the lower surface 31 and the intermediate surface 33 is the same as the distance between the surface 33 and the upper surface 32. A hub 40 (FIG. 3) is formed internally of the housing and a tapped hole 41 is provided in the hub. The arcuate wall 30 is formed on a circle that has an imaginary extension of the axis of the tapped hole 41 as its center.

The tapped hole 41 receives the threaded shank 45 of an adjusting screw 46 that has an enlarged annular flange 47, and an upper portion having a reduced diameter stem 49. A wheel 53 is provided with a hub 54 having a central bore in which the adjusting screw 46 is secured by a setscrew 55 that engages the reduced diameter stem 49. Access to the setscrew 55 is provided by an opening 56 in a peripheral flange of the wheel. A camber dial 58 (FIG. 2) is marked on the face of the wheel, as by painting, to indicate degrees of positive and negative camber in 1/8 degree increments.

A caster dial 60 is rotatably mounted on the wheel 53 by means of a capscrew 61 (FIG. 4) that is threaded into a dial-actuating knob 62. The head of the screw 61 bears against a brass bushing 63 which in turn presses the caster dial 60 against the knob 62. The bushing 63 is rotatably disposed in a cylindrical opening 64 in the exact center of the wheel 53, and an annular collar formed on one end of the bushing bears against the under surface of the upper wall of the wheel. An annular felt pad 66 is disposed in an annular recess in the face of the wheel, the pad being somewhat thicker than the recess is deep so that the dial is held in spaced relation above the housing. It will be noted that the bushing 63 and the felt pad 66 mount the caster dial 60 for the free rotation relative to the wheel 53.

The spirit level 75 (FIGS. 2 and 3) which is mounted by means of cement in a chamber 76 in the end of a lever 77, is positioned longitudinally of the gauge housing and parallel to the longitudinal axis of the housing.

The lever 77 is pivotally mounted on a pin 81 (FIG. 3) that is at right angles to the longitudinal axis of the housing and is pressed into aligned openings in a pair of bosses 82 (FIG. 2) that are cast on the inner wall of the housing. An access hole 83 (FIG. 1) is provided in each side of the housing to permit insertion of the pin 81 in the bosses 82. The lever 77 is provided with a forked end 84 (FIG. 3) which has two arms (one only being shown) disposed on opposite sides of the adjusting screw 46, each arm having an upper rounded surface bearing against the underside of the flange 47 of the adjusting screw. A coil spring 86 is disposed between the housing and the forked end 84 of lever 77 to urge the lever in a clockwise direction (FIG. 3) and to hold the forked end in engagement with the circular flange 47.

A second spirit level 90 is secured by cement under the flattened wall 23 of the housing, the bubble of the spirit level being visible through an opening 91 in the flat wall 23. This level 90 is disposed at right angles to the longitudinal axis of the housing and is generally parallel to the upper surface of the flat wall 23.

An annular, permanent magnet unit 92 is secured, as by a press fit, in the open end of the housing 20. The flat outer ends of the poles of the magnet define a contact surface that is disposed perpendicular to the longitudinal axis of the housing. As seen in FIG. 7, when the gauge 10 is placed in operative engagement with the hub of the wheel, the contact surface of the magnet engages the planar surface provided by the end of the hub of the wheel. Since this planar surface is perpendicular to the axis of rotation of the wheel, a definite reference plane is established.

The gauge 10 is centered relative to the hub of the wheel by the insertion of the frusto-conical end 95 (FIG. 3) of a centering tube 96 in a socket 97 (FIG. 7) provided in the end of the wheel spindle 98. In order to permit the magnet to move into engagement with the hub after the gauge is centered, the centering tube 96 is slidably journalled in a support member 99 (FIGS. 3 and 5) that extends transversely across the inside of the housing 20 immediately behind the magnet unit 92. A spring 100 (FIG. 6) extends between the rear wall of a U-shaped bracket 101 and an internal annular shoulder 102 formed in the centering tube 96. The bracket 101 may be secured to the transverse support member of the housing in any suitable manner, as by making it of rigid material and bending the end portions 101a and 101b back against the face of the transverse support member 99.

It will also be noted in FIGURE 7 that the hollow central area of the centering tube 96 provides a chamber that is adapted to receive an end portion 102a of the speedometer cable 102 of any automobile that drives its speedometer cable from the hub cap of one of the wheels.

The projector mounting bar 14 is a tubular member of square cross-section that is removably locked on the gauge 10 by a stud 103 (FIG. 3), that is threaded into the bracket 12, and by a nut 104 that is threaded onto the end of the stud. The chart 16 includes a rigid frame 105 which is bolted to the end of the bar 14 and is provided with an apertured rear wall 106 to which a panel 107 is secured. The panel 107 has a white surface on which a vertical black reference line 108 is marked, the white surface providing a screen on which a toe-in, toe-out scale 109 is projected by the projector 17 of the opposite unit. The frame 105 has an opening 110 in an upper flange 113 adjacent an arcuate opening 114 in its rear wall, and the cylindrical body of the projector is positioned in these openings. The body of each projector is provided with a pair of oppositely projecting integrally-formed fins 111 and 112 which underlie the upper flange 113 of the frame and are bolted thereto. Each projector includes a generally cylindrical hollow housing 115 (FIG. 8) in one end of which a lamp holder 116 is secured by a setscrew 117. A lamp 120 is removably positioned in a socket 119 of the lamp holder 116 and is arranged to direct its beam longitudinally of the housing through a condensing lens 122 and through a reticle 123 of lantern slide glass on which the lines and reference characters of the toe-in, toe-out scale are marked. The lens 122 is disposed against a shoulder in a tubular opening at one end of a lens holder 124 that is secured in the housing, and the reticle 123 is secured across the other end of the opening in the holder 124 by a plurality of capscrews and washers. A lens assembly 130 is secured by a capscrew 131 in the other end of the projector housing. This lens assembly may have a focal length of four inches and be of the type marketed by Argus Cameras of Ann Arbor, Mich., as Model No. 57810. A suitable electric cord 132 (FIG. 1) is connected to the socket 119 to supply electric energy to the lamp. In a preferred arrangement, the electric cord is provided with a spring-loaded clip of the type that is used to attach electric cords to battery terminals. When such a clip is provided, the battery of the automobile furnishes the electric energy for the projector. If 110 volt current is used, a transformer is connected in the line.

In FIGURE 9, an embodiment of the wheel checking apparatus is shown that is adapted for use on wheels having hubs that are not capable of being gripped by the magnet. In this embodiment, a wheel clamp 140 is attached to the rim of the wheel. This clamp may be of the type disclosed in the patent to Holmes No. 2,475,502 and, in general, comprises a rigid T-shaped frame including a pair of spaced rods 141 and 142 and a transverse bar 143 forming the top of the T. A rim-gripping member 145, which has a sharpened or serrated edge (not shown) is mounted on each end of the transverse bar 143, and an identical rim-gripping member 147 is mounted on a locking unit 148 that is slidably journalled on the two rods 141 and 142. A handle 150 is connected to a shaft 153 that is rotatable in the housing of the locking unit to urge the edge of the gripping member 147 into gripping engagement with the rim of the wheel. To install the clamp on a wheel, the gripping members 145 on the transverse bar 143 are placed in contact with the inner surface of the wheel rim adjacent the edge thereof. The locking unit 148 is then slid along the rods 141 and 142 to bring the gripping member 147 into engagement with the wheel rim, and then the handle 150 is actuated to move the gripping member into spring-loaded locked engagement with the rim, in the manner disclosed in the above mentioned Holmes patent No. 2,475,502.

A tool-mounting slide 160 is adjustably secured by cap-screws 161 and locking plates 162 on the rods 141 and 142 so that a tapered pilot hole 163a which is disposed at the center of a circular metal plate 163, that is carried by the slide 160, is aligned with the axis of the wheel.

The circular plate 163 is pivotally mounted on the slide 160 by a pair of aligned setscrews 164 (FIG. 11) that are held in place by jam nuts 165. Each setscrew 164 passes through an opening in one of two spaced flanges 166 formed on diametrically opposite portions of the circular plate, and has a conical end that seats in hole 167 in an insert which is fixedly secured in one of two opposed flanges 168 on the slide. The pivotal axis defined by the setscrews 164 passes through an extension of the center of the circular plate 163.

The circular plate is urged in a clockwise direction (FIG. 10) about the setscrews 164 by a spring 169 that is disposed in annular recesses 170 and 171 formed in the circular plate and in the slide, respectively. A setscrew 172 is threaded into the slide at a point diametrically opposed to the annular recess 171 and locked in place by a nut 173. A knurled nut 174 is threaded on the setscrew 172 and is movable longitudinally thereon to various positions which will determine the amount of pivoting of the circular plate 163 and also the planar position of the flat surface 175 of the plate 163.

As previously mentioned, when the gauge 10 is applied directly to the end of the hub of the wheel a vertical reference plane is established. Due to the fact that some rims are not accurately formed, a wheel rim does not form a reliable reference plane. However, the mounting means for the circular plate 163 provides means whereby such a reference plane may be established. To establish this plane, the clamp 140 is secured on the rim of the wheel when the wheel is resting on the rotatable element 178 of a turntable 179 which is provided with a scale 179a marked in degrees and a fixed pointer 179b. The clamp is adjusted on the rim until the rods 141 and 142 are horizontal; the gauge 10 is brought into magnetically gripping engagement with the surface 175 of the plate 163; and the wheel is jacked up a short distance to move it out of engagement with the turntable.

The cross level 90 (FIG. 9) of the gauge is centered by rotating the gauge relative to the plate 163. The longitudinal level 75 is centered by turning the dial wheel 53, and the caster gauge 60 is then rotated relative to the wheel 53 to bring the zero on the gauge scale into alignment with the reference notch 34 on the arcuate parapet or wall 30 (FIGS. 1 and 2). The automobile wheel is then rotated 180° while the gauge 10 is held right side up, that is, the gauge is not rotated with the wheel. The cross level 90 is again centered, as is the longitudinal level 75. The caster dial 60 is now read to obtain an initial reading. The dial is then set to one-half of the initial reading, causing the bubble in the dial to move away from a centered position. The dial is again leveled by turning the knurled nut 174, and the wheel is lowered onto the turntable. This procedure establishes a vertical working plane which compensates for any run-out due to imperfect wheel rims.

*Camber measurement.*—Camber measurements are made in the same manner when the gauge 10 is magnetically secured directly on the wheel as they are when the gauge is mounted on the wheel by means of the wheel clamp 140. The vehicle wheels are first set straight ahead and then the gauge is rotated about its longitudinal axis to center the cross level 90. The dial wheel 53 is then rotated to center the longitudinal level 75. The camber is then read directly from the camber dial 58. In FIGURE 12 a camber reading of positive ¾ degree is indicated. A wheel alignment chart must then be consulted to see whether or not the indicated camber is correct for the wheel being tested.

It will be noted that zero camber is indicated when the upper surface of the dial wheel 53 is flush with the central surface 33 of the parapet 30 (FIG. 2) and the zero on dial 58 is aligned with the index mark 34. A full turn of the dial wheel clockwise will dispose the upper surface of the wheel flush with the lower surface 31 of the parapet and the camber reading will be positive 4 degrees. A full turn of the dial wheel counterclockwise from the zero camber setting will put the surface of the dial wheel flush with the upper surface of the parapet and the camber reading will be negative 4 degrees.

*Caster measurement.*—The front wheel of the vehicle is turned out 15 degrees from its straight ahead position. The cross level 90 is centered by rotating the gauge, and the longitudinal level 75 is centered by rotating the dial wheel. The hexagonal knob 62 is then grasped and, while the dial wheel is held against rotation, the caster dial 60 is rotated to align the zero of the dial 60 with the index mark 34 as shown in FIGURE 13. The vehicle wheel is then turned in 15 degrees from its straight ahead position. The cross level 90 is centered by rotating the gauge, and the longitudinal level 75 is centered by rotating the dial wheel 53. When the level 75 is centered, the caster is read directly on the caster dial 60. In FIGURE 14, a caster reading of about positive ⅝ degree is indicated. A wheel alignment chart must then be consulted to see whether or not the indicated caster reading is within an acceptable range for the particular wheel being tested.

As noted above when the gauge 10 is used, a wheel alignment chart must be consulted after each reading to see if the camber or caster reading is within an acceptable range. A feature of the present invention is the provision of templates, each of which is calibrated to automatically indicate whether or not the camber or caster angle is within the desired range.

As seen in FIGURE 15 which is a plan view, each template 180 is a flat circular plate made of rigid material and having a thickness of about 0.05 inches and a diameter of 2¹³⁄₁₆ inches, which is substantially the diameter of the dial wheel 53 also. Each template has a scale marked thereon that is graduated around approximately one half of its periphery in degrees of camber in ¼ degree increments, and around a large part of the other half of its periphery in degrees of caster in ½ degree increments. Each template has a central aperture 182 of hexagonal configuration, adapted to be placed over the hexagonal knob 62 of the caster dial, and is provided with a diamond-shaped window 183 near its periphery.

As noted above, on FIGURE 12 is shown a camber reading of positive ¾ degree obtained when the wheel of a particular vehicle was checked. It will be noted that the ¾ degree mark on the camber dial is 22½ degrees counterclockwise from the zero mark. Accordingly, assuming that a positive ¾ degree camber is the correct camber for this particular vehicle, the template 180 for that particular vehicle is made by marking a zone 185 of contrasting color on the face of the template, the center of the zone at the periphery of the template being 22½ degrees counterclockwise from the window 183, and the side edges of the zone being on boundary lines 186 and 187.

*Camber measurement using template.*—To check the camber of the vehicle using the template 180, the template is placed over the caster dial as seen in FIGURE 15 with the knob 62 received in the center hole 182, the sides of the knob being in driving engagement with the walls defining the hole 182. The dial wheel 53 is held stationary while the knob 62 is rotated until the zero of the camber dial 58 appears in the window 183. The cross level 90 is centered by rotating the gauge, and the longitudinal level 75 is centered by rotating the dial wheel 53 and the template 180 as a unit. If the camber of the wheel is in perfectly adjusted condition, the center of the colored zone 185 will now be aligned with the index mark 34 on the parapet. If the adjustment is not perfect but is within acceptable limits, some part of the colored zone will be opposite the index mark. It will be noted that, on opposite sides of the zone 185, the legends "INC" and "DEC" are marked on the template. If, after the camber check has been made, the index mark 34 is opposite the area to the right of zone 185, the camber of the wheel must be increased so that, when a subsequent check is made, the index mark will be opposite the zone. Similarly, if, after the check has been made, the index mark is opposite the area bearing the legend "DEC," the camber of the wheel must be decreased.

*Caster measurement using template.*—Referring to FIGURES 13 and 14, it will be noted that to measure caster using the camber and caster dials 58 and 60, the zero of the caster dial was set opposite the index mark 34 after a camber reading had been taken when the wheel was turned 15 degrees out. Then, after the wheel was turned 15 degrees in, the dial wheel 53 and the caster dial 60 were turned as a unit to center the longitudinal level 75. The caster was then read directly on the caster dial 60. Thus caster is read in terms of an angular displacement of the zero reading of the caster dial relative to the index mark 34.

The template 180 is provided with an arrow alongside of which is the legend "OUT 15° SET" at one portion of its periphery, and a colored zone 190 at a point spaced along the periphery from this legend. The arrow will be referred to as the "set" arrow hereinafter. The zone is bounded by marks 191 and 192, and an arrow marked "IN 15° READ," which will be referred to as the "read" arrow. To make a caster template for the front wheels of a particular vehicle, the colored zone 190 is marked on the template at a position that is spaced a predetermined angular distance around the periphery of the template from he "set" arrow. To check the caster of a wheel with the gauge 10 installed thereon, the wheel is turned out 15 degrees from its straight ahead position and the cross level 90 and the longitudinal level 75 are centered. Then, while holding the dial wheel stationary, the hex knob 62 is rotated to line up the "set" arrow with the index mark 34 as shown in FIGURE 16. The wheel is then turned 15 degrees in and the cross level 90 is centered. The dial wheel 53 is rotated to center the longitudinal level 75. The template 180, of course, rotates with the dial wheel 53 and, if the caster of the wheel is perfect, the index mark 34 will be aligned with the "read" arrow. If the caster of the wheel is not perfect but within acceptable tolerances, the index mark will be opposite some part of the colored zone 190. If the index mark is aligned with a portion of the periphery of the template marked "DEC," the caster of the wheel must be decreased so that a subsequent check will cause the index mark to align with some part of the zone 190. If the index mark is aligned with a portion of the periphery of the template marked "INC," the caster must be increased.

*Measuring toe-in.*—Referring to FIGURE 1, it should be noted that the outer end of each rod 14, which is perpendicular to the axis of the gauge and the axis of the projector, is supported by a vertical post 200 that is fastened to the rod 14 and has a roller 201 rotatably mounted at the lower end thereof. The roller permits the post 200 to support the arm and yet move readily as the wheel is turned in and out during testing operations.

Since the axis of each projector is directly above the reference line 108 on the associated screen 107 and is parallel to the longitudinal axis of the associated gauge 10, when the wheels are in a straight ahead position, the zero line on each of the projected scales 109 will be centered on the vertical reference line 108 of the screen 107 on which it is projected. If the wheels have some toe-in, the images will be displaced and, for example, the image shown in FIGURE 1 may be displaced to the right and the projected line indicated by numeral 199 might be aligned with the vertical line 108 of the screen. This would indicate a toe-in of 1/8 inch. Accordingly, to check the toe-in of the wheels of a vehicle, the wheels are turned slightly until the zero reference line of the scale projected from one wheel falls on the zero line 108 of the opposite screen. The total toe-in for both wheels is then indicated by the scale image projected on the opposite screen 107. To set the toe-in and center the steering wheel of the vehicle, the steering wheel is set on center and the tie rod ends are adjusted to divide the specified toe-in between the wheels.

*Toe-out on turns.*—To check this characteristic of the front wheels, the turntable scales are set with their zero markings opposite the associated pointers when the wheels are in a straight ahead position. One wheel is then turned in 15 degrees at the front. The toe-out of the other wheel is then read from the scale of the turntable on which it rests. This reading should, of course, be greater than 15 degrees. The procedure is repeated starting with the other wheel turned in 15 degrees. The two toe-out readings should be equal within 1 degree.

From the foregoing description, it will be apparent that the present invention provides a novel, efficient system for checking the alignment characteristics of automobile wheels. The compact gauge is adaptable for use for checking camber and caster against an official reference chart, or for use with the unique templates of the present invention. The provision of means for mounting the toe-in chart and projector on the gauge for unitary movement therewith, makes possible the quick and efficient checking of toe-in and toe-out, using the gauge to establish a predetermined relation between the plane of the wheel and the projected scale.

While particular embodiments of the present invention have been shown and described, it will be understood that the wheel checking system is capable of variation without departing from the principles of the invention, and that the scope of the invention should be limited only by the scope and proper interpretation of the claims appended hereto.

Having described my invention, what I claim as new and desire to protect by Letters Patent is:

1. In wheel alignment checking apparatus, an elongate housing having a tubular end portion, a circular magnet disposed in said tubular end portion and having a flat face adapted to grip the end face of the hub of a wheel, and a centering member mounted in said housing on the axis thereof and having a tapered end arranged for pilot engagement in a socket in the end of the spindle of the wheel, said centering member being tubular and having a central chamber adapted to receive a cable projecting from the spindle of the automobile wheel.

2. In wheel alignment checking apparatus, an elongate housing, means for mounting said housing on an automobile wheel with the longitudinal axis of the housing generally perpendicular to the plane of the automobile wheel, a spirit level mounted in said housing for pivoting movement about an axis parallel to the plane of the wheel, a rotatable dial wheel mounted on said housing and operatively connected to said level whereby rotation of said dial wheel effects pivoting of said level, means providing an index mark on said housing adjacent said dial wheel, said dial wheel being so mounted on said housing and connected to said level that a reference mark on said dial wheel and the index mark on said housing are in radial alignment when the automobile wheel is in a vertical plane and said level is centered, a caster dial disposed on said dial wheel in partially overlying relation, means mounting said caster dial for rotation about the axis of rotation of said dial wheel and relative to said dial wheel, means providing a zero mark on said caster dial adapted to be positioned in alignment with the reference mark on said dial wheel when the automobile wheel is turned outwardly a predetermined angular distance from a straight ahead position and said level is in centered position, said level being moved due to caster of the wheel away from centered position as the automobile wheel is turned inwardly said predetermined angular distance from the straight ahead position, said caster dial being rotatable as a unit with said dial wheel to center said level after the automobile wheel is turned inwardly said predetermined angular distance, the angular displacement of the zero mark on said caster dial from the index mark on said housing being a measure of the caster angle of the automobile wheel.

3. In wheel alignment checking apparatus, an elongate housing, means for mounting said housing on an automobile wheel with the longitudinal axis of the housing generally perpendicular to the plane of the wheel, a spirit level, means mounting said level in said housing for pivoting movement about an axis parallel to the plane of the wheel, a dial wheel mounted atop said housing for rotation about an upstanding axis and operatively connected to said level whereby rotation of said wheel effects pivoting of said level, means providing an index mark on said housing adjacent said dial wheel, means providing a reference mark on said dial wheel, said dial wheel being so mounted on said housing and connected to said level that the reference mark on said dial wheel and the index mark are alignment when the automobile wheel is in a vertical plane and the level is centered, a replaceable template adapted to be positioned on said dial wheel and having a window adapted to overlie the reference mark on said diel wheel, and means providing a reference zone marked on said template and angularly spaced about the axis of the dial wheel from said window, the spacing of said zone from said window being equal to the increment of rotation of said dial wheel necessary to center said level when the automobile wheel is inclined at a predetermined angle from the vertical.

4. In wheel alignment checking apparatus, an elongate housing, means for mounting said housing on an automobile wheel with the longitudinal axis of the housing perpendicular to the plane of the automobile wheel, a spirit level mounted in said housing for pivoting movement about an axis parallel to the plane of the wheel, a rotatable dial wheel mounted on said housing and operatively connected to said level whereby rotation of said dial wheel effects pivoting of said level, said dial wheel having a flat circular face and having a reference mark at one point on its periphery, means providing an index mark on said housing adjacent said dial wheel, said dial wheel being rotatably adjustable on said housing and so connected to said level that the reference mark on said dial wheel and the index mark on said housing are in radial alignment when the automobile wheel is in a vertical plane and said level is centered, a circular template overlying the face of said dial wheel and having a 15 degree out reference mark thereon adapted to be positioned in radial alignment with said index mark when the automobile wheel has been swung 15 degrees out from its straight ahead position and said dial wheel has been rotated to displace said reference mark from said index mark to center said level, and means connecting said dial wheel and said circular template for unitary rotation, said template having a zone marked on the peripheral edge thereof spaced a fixed angular distance from said 15 degree out reference mark, the angular spacing of said zone from said 15 degree out mark being equal tot he increment of angular rotation of said dial wheel necessary to center the level after the automobile wheel has been swung to a position 15 degrees in from the straight ahead position and the level has been moved from centered position during said swinging movement of the wheel due to caster in the wheel.

5. In wheel alignment checking apparatus an elongate housing having a flat face adapted for abutting contact with the end of the hub of a wheel, means for mounting said housing on an automobile wheel with the longitudinal axis of the housing generally perpendicular to the plane of the automobile wheel, a spirit level extending longitudinally in said housing, an internally threaded support member in said housing, an adjusting screw threaded into said support member and having an enlarged annular flange, a lever mounted in said housing for pivotal movement about an axis transverse to the axis of said housing, said lever having one end connected to said spirit level and the other end underlying said annular flange, a spring between said housing and said lever for urging said lever into contact with the underside of said flange whereby downward movement of said flange when said screw is threaded downward into said support member causes pivoting of said lever, a dial wheel secured to said adjusting screw, a scale marked on the face of said dial wheel, means providing a zero reference mark on said scale, and means providing a fixed index mark on said housing adjacent the periphery of said dial wheel, the position of said dial wheel and said level in said housing being such that said level is centered and the zero reference mark on said scale is aligned with the index mark on said housing when the flat contact face of said gauge is in a vertical plane.

6. In wheel alignment checking apparatus, a gauge support member having a plurality of spaced elements positioned in a circular pattern and arranged to grip the rim of a wheel at spaced points on the rim; means providing a pair of ears projecting outwardly from said support member parallel to and on opposite sides of a reference axis passing through the center of said circular pattern; a mounting plate pivoted on a pivot axis passing through said ears and having a central pilot hole disposed in alignment with said reference axis; spring means connected between said mounting plate and said support member on one side of said pivot axis; an adjusting screw disposed between said mounting plate and said support member for limiting the pivoting of said mounting plate under the urging of said spring means; and a gauge having a flat face in gripping contact with said mounting plate, a spirit level mounted in a plane parallel to the plane of said mounting plate, a spirit level mounted in a plane transverse to the plane of said mounting plate, and means including a centering member on said gauge disposed in said pilot hole for centering said spirit levels.

7. In wheel alignment checking apparatus, a housing having a reference plane generally perpendicular to the axis of the automobile wheel to be checked, a spirit level pivotally mounted in said housing, a dial wheel rotatable about an upright axis on said housing and operatively connected to said level to pivot the level, a drive member projecting upwardly from the center of said dial wheel, means mounting said drive member for selective rotation with said dial wheel or relative to said dial wheel, a replaceable template disc having a socket adapted to receive said drive member whereby said disc may be selectively rotated with said dial wheel or relative to said dial wheel, means providing a fixed index mark on said housing, said disc having a first scale on one peripheral area cooperable with said index mark and said dial wheel for determining whether or not the camber angle is within a desired range of angles, and having a second scale at a different peripheral area for determining whether or not the caster angle is within a desired range of angles.

8. In wheel alignment checking apparatus, an elongate housing having a longitudinal axis, a first spirit level mounted in said housing transversely of said axis, a second spirit level pivotally mounted in said housing and disposed longitudinally of said housing, a camber wheel rotatably mounted in said housing and operatively connected to said second spirit level to pivot said level, said camber wheel having a flat circular face with a scale marked around the peripheral edge thereof, means defining a cylindrical aperture at the center of said camber wheel, a bushing in said aperture, a caster dial secured to said bushing for rotation relative to said camber wheel, means spacing said caster dial from said camber wheel, said caster dial being circular and having a diameter smaller than the diameter of said camber wheel, and means providing a caster scale on said caster dial.

9. In wheel alignment checking apparatus, a housing having a reference planar surface generally perpendicular to the axis of rotation of the automobile wheel to be checked, a camber wheel rotatable on said housing and having a flat circular face, means defining an index mark on said housing adjacent the periphery of said wheel, a level pivoted on said housing and cooperating with said camber wheel for determining the camber angle of the automobile wheel, a template disc adapted to be positioned closely adjacent the face of said camber wheel, means connecting said template to said camber wheel for rotation therewith, said template disc having a reference mark adjacent its periphery and a marked zone on the periphery of the disc in spaced relation to the reference mark, the angular displacement of said zone from said reference mark being equal to the increment of angular rotation of said camber wheel necessary to center said level when the automobile wheel has a predetermined camber angle.

10. Apparatus according to claim 1 and including a spring connected between said housing and said tubular centering member for resiliently urging said member to a position in which said tapered end is disposed outwardly of said housing for pilot engagement with the spindle socket.

11. Wheel alignment checking apparatus comprising an elongate housing, means for mounting said housing on an automobile wheel with the longitudinal axis of the housing generally perpendicular to the plane of the automobile wheel, a spirit level mounted in said housing for pivoting movement about a horizontal axis parallel to the plane of the wheel, a rotatable dial wheel mounted on said housing for movement about an upright axis, said dial wheel being operatively connected to said level whereby rotation of said dial wheel effects pivoting of said level, means providing an index mark on said housing adjacent said dial wheel, said dial wheel being so mounted on said housing and connected to said level that a zero reference mark on said dial wheel and the index mark on said housing are in radial alignment when the automobile wheel is in a vertical plane and the bubble in said level is centered, a removable template disposed on said dial wheel and having a window adapted to overlie said zero reference mark on said dial wheel, and means providing a reference zone on said template adapted to be positioned adjacent the index mark on said housing when said level is in centered position, said template being rotatable as a unit with said dial wheel to center the bubble in said level, the angular displacement of the zero mark on said dial wheel from the index mark on said housing being a measure of the camber angle of the automobile wheel and displayed on said template by the position of said reference zone on said template relative to said index mark on said housing.

12. Wheel alignment checking apparatus comprising an elongate housing, means for mounting said housing on an automobile wheel with the longitudinal axis of the housing generally perpendicular to the plane of the automobile wheel, a spirit level mounted in said housing for pivoting movement about a horizontal axis parallel to the plane of the wheel, a rotatable dial wheel mounted on said housing for movement about an upright axis, said dial wheel being operatively connected to said level whereby rotation of said dial wheel effects pivoting of said level, means providing an index mark on said housing adjacent said dial wheel, said dial wheel being so mounted on said housing and connected to said level that a zero reference mark on said dial wheel and the index mark on said housing are in radial alignment when the automobile wheel is in a vertical plane and said level is centered, a removable template disposed on said dial wheel, means mounting said template on said dial wheel for selective rotation with and for rotation relative to said dial wheel, means providing "set" and "read" marks on said template, said "set" mark being adapted to be positioned in alignment with the reference mark on said housing when the wheel of the automobile is turned outwardly a predetermined angular distance from a straight ahead position and said level is in centered position, said level being moved due to caster of the wheel away from centered position as the automobile wheel is turned inwardly said predetermined angular distance from the straight ahead position, said template being rotatable as a unit with said dial wheel to center said level by aligning said "read" mark with said reference mark on said housing after the automobile wheel is turned inwardly said predetermined angular distance, and means on said template defining a reference zone which includes said "read" mark, said zone indicating the allowable tolerance in the caster angle of the automobile wheel.

References Cited

UNITED STATES PATENTS

| | | | |
|---|---|---|---|
| 2,608,000 | 8/1952 | Castiglia | 33—203.18 |
| 2,729,896 | 1/1956 | Rosenblum | 33—203.18 |
| 2,780,875 | 2/1957 | Carr | 33—203.18 |
| 3,071,863 | 1/1963 | MacMillan | 33—203.18 X |
| 3,081,546 | 3/1963 | Wilkerson | 33—203.18 X |
| 3,188,747 | 6/1965 | Race | 33—203.18 |
| 3,199,208 | 8/1965 | Hunter | 33—203.18 |
| 3,222,794 | 12/1965 | Pereue et al. | 33—203.18 |

FOREIGN PATENTS 208,475   1/1957   Australia.

WILLIAM D. MARTIN, Jr., *Primary Examiner.*

U.S. Cl. X.R.

33—203, 46